J. H. MILLS.
CLAMP.
APPLICATION FILED SEPT. 12, 1908.
12,864. Reissued Oct. 13, 1908.
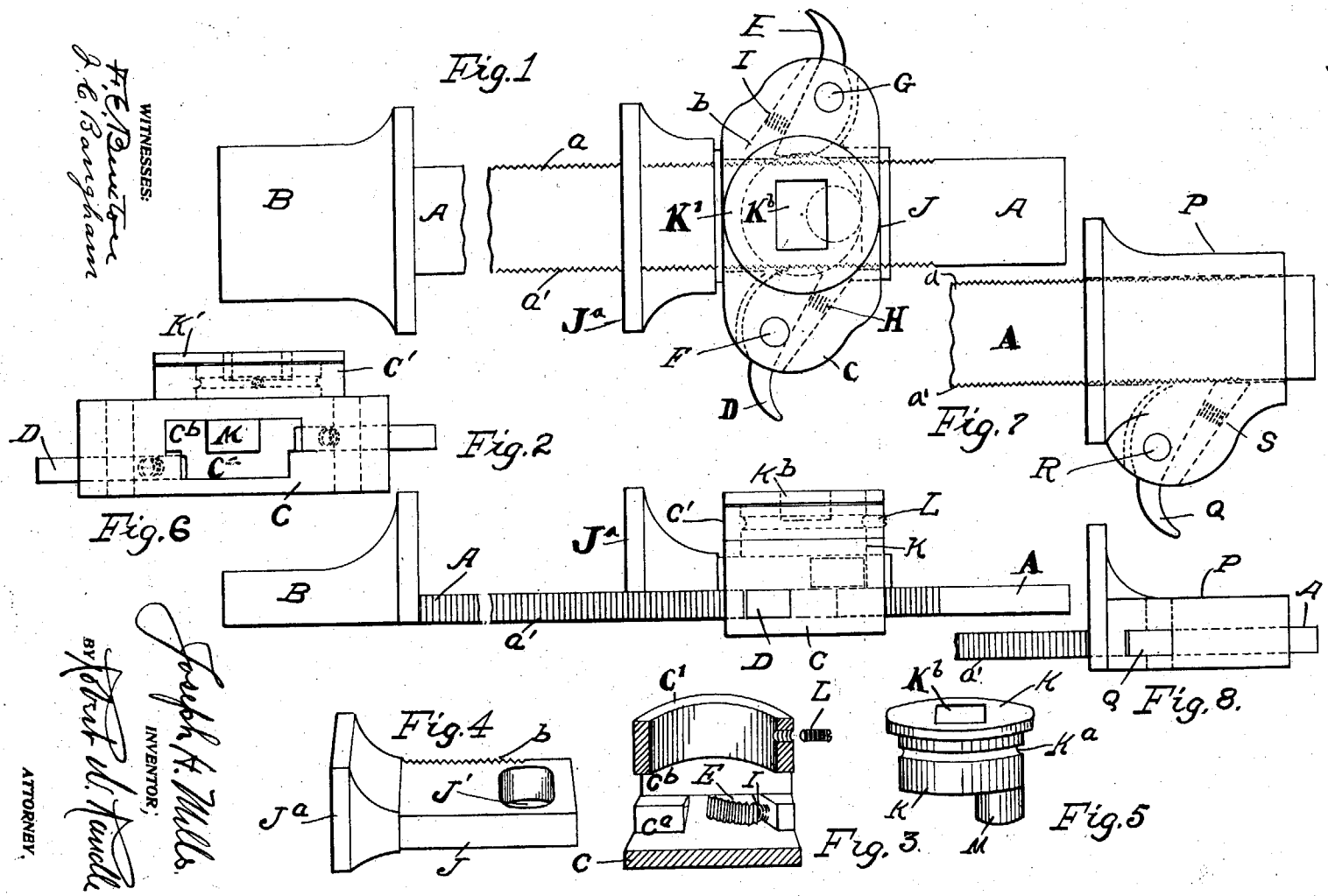
WITNESSES:
F. E. Benton
J. E. Bangham
Joseph H. Mills.
INVENTOR;
BY Robert W. Landle
ATTORNEY.
THE NORRIS PETERS CO., WASHINGTON, D. C.

UNITED STATES PATENT OFFICE.

JOSEPH H. MILLS, OF RICHMOND, INDIANA.

CLAMP.

No. 12,864. Specification of Reissued Letters Patent. Reissued Oct. 13, 1908.

Original No. 888,834, dated May 26, 1908, Serial No. 397,659. Application for reissue filed September 12, 1908. Serial No. 452,804.

*To all whom it may concern:*

Be it known that I, JOSEPH H. MILLS, a citizen of the United States, residing at the city of Richmond, in the county of Wayne and State of Indiana, have invented certain new and useful Improvements in Clamps, of which the following is a full and accurate specification.

The object of my present invention, broadly speaking, is the provision of a clamping device which will be strong and durable in construction, positive in action, neat and attractive in appearance, and which can be manufactured and sold at a comparatively low price.

More specifically stated, my object is to provide a clamp for easily and positively bringing together and retaining two or more elements, as for instance, in making glue-joints; and furthermore to provide means for quickly adjusting the heads of the clamp whereby they will themselves automatically engage and in addition thereto to provide an eccentric mechanism whereby the desired amount of pressure may be applied by hand in connection with a wrench for that purpose.

This invention contemplates a bar of any desired length over which may slide a clutch, the latter carrying a head to be actuated independently by an eccentric; oppositely disposed to said clutch is a relatively fixed head, which, if desired, may be made adjustable along or permanently secured to one end of said bar.

The construction of my invention is shown most clearly in the accompanying drawings, forming a part of this specification, in which—

Figure 1 is a top plan view of my preferred construction. Fig. 2 is a side elevation of the same. Fig. 3 is a perspective sectional detail of a portion of the clutch. Fig. 4 is a detail perspective of the adjustable head, whose shank operates in the clutch mechanism or casing. Fig. 5 is a detail perspective of the eccentric disk. Fig. 6 is an end elevation of the clutch casing. Fig. 7 is a detail plan view of a modified form for the relatively fixed head. And Fig. 8 is a detail side elevation of the parts shown in Fig. 7.

Similar indices denote like parts throughout the several views.

In order that the invention may be more fully understood I will now take up a detail description in which I will describe the construction and operation of my invention as briefly and as compactly as I may.

In the drawings the letter A denotes a metal bar which may be of any desired length. Formed in the two edges of said bar are series of fine serrations or knurls, *a* and *a'*, which may extend from end to end of the bar, projecting laterally across the edges as shown, or they may be located only at points where contact may be desired, for the purpose hereinafter set forth. In Figs. 1 and 2 the letter B denotes the relatively fixed head which should be secured to one end of said bar in any well known manner. The numeral C denotes the casing or body of the clutch member which is slidable on said bar, there being a slot $C^a$ formed through the casing for that purpose as shown. Opening into said slot, located immediately thereabove, and of greater width, is the slot $C^b$, for the purpose hereinafter set forth.

In the center of the upper face of the casing C is a comparatively large round aperture, from around which extends upward the permanent collar C'. Said round aperture opens at its base into the slot $C^b$.

The letters D and E designate two dogs or pawls which are identical with each other but are oppositely disposed and are located on different planes of elevation. Said dogs or pawls are mounted horizontally in spaces formed therefor in the respective side extensions of the casing C.

The dog or pawl D is located in alinement horizontally with the slot $C^a$ and, also, with the bar A when it is in operative position as in Fig. 1. The dog or pawl E is located in alinement horizontally with the slot $C^b$, and is for a purpose which will hereinafter be explained. Said dogs or pawls are pivoted on their respective pivots F and G which are disposed vertically in the extensions of the casing C as shown in Fig. 1. Said dog or pawl D has an inner contact face which is knurled to correspond with and to engage the series of knurls or serrations *a*, or *a'*, of the bar A, with which it is normally and resiliently retained in engagement by the helical spring H. The dog or pawl E also has an inner contact face which is knurled to correspond with and to engage the series of knurls or serrations *b* which are formed on one edge of the shank J, with which it may be normally and resiliently retained in engagement by the helical spring I. A finger hold extends outside the casing from each of said dogs to afford means by which the dogs may be released by hand when the pressure on the heads is released.

The letter J designates a shank which is adapted to fit and slide endwise in the slot $C^b$, having an oblong aperture $J^1$ formed laterally therethrough near its outer end portion, while on the opposite end of said shank is secured the head $J^a$, and in one edge of said shank is formed the series of knurls *b*, which extend only to a point short of the movement of the head $J^a$ when it is actuated by the eccentric to clamp the elements, all substantially as shown in Fig. 4.

The letter K denotes a round disk formed to fit the said round aperture therefor in the center of the casing C and extending from the upper edge of the collar C′ down to the surface of the slot $C^b$, as indicated in Fig. 2. A head or crown K′ is formed integral with the upper end of the disk K which crown extends out even with the periphery of the collar C′, as indicated.

Formed around in the periphery of the disk K is a channel $K^a$, and disposed through the collar C′ is a set-screw L which is adapted to be run in and out, with its point adapted to enter said channel $K^a$ in order to prevent the disk K from being removed, when the screw is run in, but allowing the disk to revolve as desired. Means should be provided for turning the disk K by a wrench or the like, for this purpose I prefer to form a square or oblong cavity in the center of the crown K′, extending down some distance in the disk K, which cavity is denoted by index $K^b$.

Extending down from the underside or face of the disk K, and located near one edge thereof, is a round eccentric-stem M which may be integral with the disk. The diameter of the said stem M is infinitesimally less than is the shorter diameter of the slot $J^1$ in which it is adapted to operate.

Ordinarily the head B may be permanently secured to the end of the bar A, but I find that in some instances it is of advantage to have means for adjusting such head along the bar A,—the means for accomplishing this is shown in Fig. 7, in which the letter P denotes a slidable head having an extension on one side in which is mounted the dog Q which is mounted on the pivot R. Said dog has an inner serrate face adapted to engage the serrations of the bar A, and with which it is normally retained in engagement by the spring S. It is also apparent that, if desired, the heads B and P may both be dispensed with, and in place thereof the end of the bar A may be secured to a floor or wall or other relatively permanent element.

The operation of my invention is quite simple and is substantially as follows: The clutch mechanism is assembled carrying the several parts as shown in Fig. 1, and it may be run on the bar A until the head $J^a$ is positioned the requisite distance from the face of the head B, or P, the clutch being automatically secured by the dog or pawl D at this point. The elements to be clamped together may be placed between the heads B and $J^a$ at this time, or prior thereto, at which time it is understood that the head $J^a$ may be drawn back to its limit towards the casing C. Now by turning the disk K, either to the right or to the left, it is apparent that the eccentric-stem operating in the slot J′ will force the head $J^a$ forward as the disk is turned, and when the stem M has reached its maximum forward movement it will, manifestly, automatically lock the head $J^a$ and the shank thereof at this point, this by reason of the stem having been turned to its forward dead-center. When it is desired to loosen the elements, then being clamped, it is apparent that the disk K may be turned in either direction, and when the stem M reaches its minimum dead-center then the head $J^a$ will be drawn back to the position in which it is shown in Fig. 1, after which, if desired, the clamp and the parts thereto connected may be removed from the bar, or they may be allowed to remain at same, or some other point, as required by the width of the elements to be operated upon.

The above operation does not, necessarily, anticipate the use of the dog E which might be dispensed with, but it may be used as a precautionary measure to act as a ratchet to hold the head $J^a$ at the position to which it is moved by the eccentric-stem. Furthermore I have found it advisable to position the elements to be clamped and then slide the clutch up thereagainst and then by turning the disk to a certain predetermined degree to give the desired pressure. And in order that the stem may reach its maximum forward movement simultaneously with the pressure reaching the requisite degree of sufficiency it is apparent that the disk may be set at a certain point to give the stem a certain movement and by which the head $J^a$ will be moved the desired distance simultaneously with the stem M reaching its maximum forward movement.

I desire that it be understood that various changes may be made in the details of construction from that herein shown and described without departing from the spirit of my invention or sacrificing any of its advantages, it being apparent that the principles of this invention are susceptible of various details of construction in order to meet varying conditions.

Having now fully shown and described the best means for carrying out my invention in a practical manner, what I claim and desire to secure by Letters Patent of the United States, is—

1. A clamp comprising a bar, a head attached to the bar, a clutch-casing slidable on the bar, means for automatically securing the clutch-casing from movement opposite to said head, means for releasing the securing means, a second head having a shank slidable in the clutch-casing parallel with said bar, an eccentric mechanism for operating the second head independent of the clutch-casing and by which it will be locked when it is located at either extreme of its movements, all substantially as shown and described and for the purposes set forth.

2. A clamp comprising a bar having a series of serrations across one edge thereof, a clutch slidable on the bar, a dog D pivoted in the clutch and having means for its engagement with said serrations of the bar when the clutch (or bar) is moved in one direction, a spring for normally retaining said dog in contact with the bar, a shank having a series of serrations across one edge thereof and adapted to slide endwise through said clutch, a head formed on one end of said shank, a dog E pivoted in the clutch and having means for its engagement with said serrations of the shank when the shank is moved in one direction, a spring for normally retaining said dog E in contact with the shank, means whereby either of said dogs may be released by hand, a permanent head on one end of said bar to which the head of said shank is oppositely disposed, an eccentric located in the clutch by means of which said shank and its head may be operated independent of the movements of the clutch along said bar.

Signed at Richmond Indiana, this the 12th day of October, 1907.

In testimony whereof I have hereunto subscribed my name in the presence of two subscribing witnesses.

JOSEPH H. MILLS.

Witnesses:
ORA F. WARD,
CHAS. C. HOLCOMB.